United States Patent [19]

Ida

[11] 4,293,144
[45] Oct. 6, 1981

[54] PROTECTIVE HANDRAIL FOR FOLDING BABY CARRIAGE

[75] Inventor: Minoru Ida, Yamatokoriyama, Japan

[73] Assignee: Manten Co., Ltd., Osaka, Japan

[21] Appl. No.: 127,061

[22] Filed: Mar. 4, 1980

[51] Int. Cl.³ .............................................. B62B 7/08
[52] U.S. Cl. .................................. 280/644; 280/650; 280/751; 297/467
[58] Field of Search .............. 280/650, 649, 642, 647, 280/47.37 R, 644, 658, 42, 751; 297/DIG. 4, 464, 467, 480

[56] References Cited

U.S. PATENT DOCUMENTS

| | | | |
|---|---|---|---|
| 3,917,302 | 11/1975 | Gebhard | 280/650 |
| 3,918,760 | 11/1975 | Goldberg | 297/467 |
| 4,030,769 | 6/1977 | Peng | 280/42 |
| 4,046,401 | 9/1977 | Kassai | 280/650 |
| 4,111,454 | 9/1978 | Kassai | 280/650 |
| 4,126,331 | 11/1978 | Sloan | 280/650 |

*Primary Examiner*—David M. Mitchell
*Attorney, Agent, or Firm*—Wenderoth, Lind & Ponack

[57] ABSTRACT

A folding baby carriage foldable into the shape of a walking stick is known. The folding baby carriage of this invention is provided with a folding protective frame or handrail to protect the baby from dropping out of the carriage.

3 Claims, 4 Drawing Figures

PROTECTIVE HANDRAIL FOR FOLDING BABY CARRIAGE

The present invention relates to improvement in folding baby carriages or the like, and more particularly to a folding baby carriage provided with a protective frame to protect the baby from dropping forwardly.

A folding baby carriage which is foldable into the manner of a walking stick is known from British patent specification No. 1,154,362, for example. Such a conventional folding baby carriage was provided with a protective belt to protect the baby from accidental dropping out of the carrage. Such a protective belt is not necessarily a satisfactory protective means because it tends to bind the baby's body rather tightly and because it does not serve as a handrail for the baby.

An object of the present invention is to provide a folding baby carriage or the like provided with a folding protective frame or handrail in place of a protective belt.

Other objects and advantages of the present invention will become apparent from the following description taken with reference to the accompanying drawings, in which.

Figure 1:
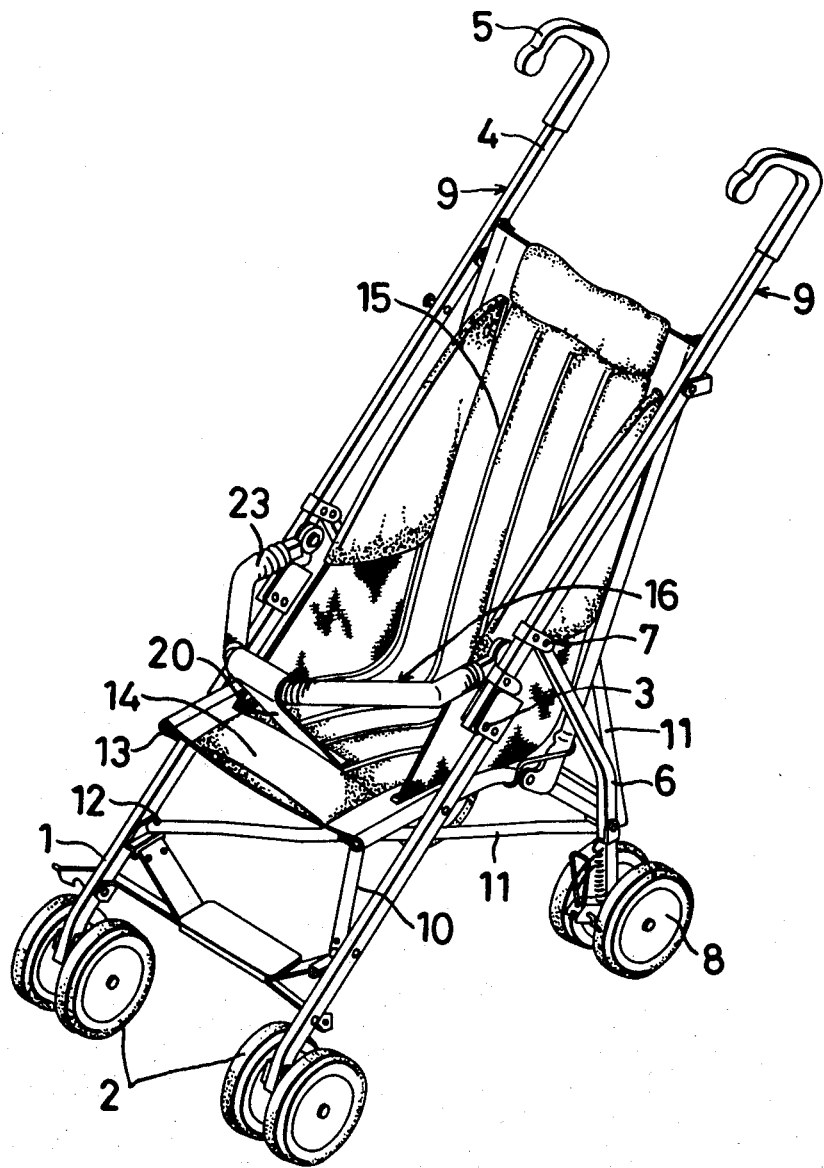
FIG. 1 is a perspective view of the baby carriage according to the present invention.

Referring to FIG. 1, a lower bar 1 having a pair of front wheels 2 rotatably mounted at its bottom is pivoted by means of a pin 3 to the lower end of an upper bar 4 having a grip 5 at its top so that these two bars can be folded from the extended straight state as shown in FIG. 1. There are two pairs of the upper and lower bars. To near the lower end of each upper bar 4 is pivoted a leg member 6 by means of a pin 7, said leg member having a pair of rear wheels 8 rotatably mounted at its lower end. Each set consisting of the upper bar 4 and the lower bar 1 form a side frame 9.

These two side frames are coupled together by means of two X-shape coupling elements 10 (only one shown), each comprising two tubes 11 pivoted at their intersection. When collapsed, these two tubes will be near-parallel to each other. One of the X-shape coupling elements 11 has its one end pivoted by pins 12 to the lower bars 1 and its other end pivoted to the leg members 6 near the lower ends of the latter. The other coupling element (not shown) have its one end pivoted to the upper bars 4 and its other end pivoted to the leg members 6 near the lower ends of the latter.

Between the leg members 6 near their lower end is pivoted by pins 28 a toggle bar 24 which has two rigid bars 25, 26 knuckle jointed together at their inner ends and a plate-like member arranged to lock the toggle bar. The toggle bar serves to keep the coupling members extended.

A pair of strut members 13 are pivoted to the upper portion of the lower bars 1 and to the leg member 6 near the lower end of the latter. A seat 14 is mounted with its edges supported on the struts 13. The back portion 15 of the seat has its top edges supported on the upper bars 4.

As described above, such a baby carriage is known from British patent specification No. 1,154,362.

A protective frame or handrail generally designated by numeral 16 includes a pair of first bars 17 each pivoted to the lower end of the upper bars 4, a pair of second bars 18 each pivoted to the other end of the first bars 17, and a coupling bar 19 having its both ends pivoted to the second bars 18 at their other ends. (FIG. 2) The protective frame 16 is coupled with the seat 14 by a safety belt 20.

Pivotal coupling between the upper bars 4 and the first bars 17 is made by means of pins 21 having a horizontal axis whereas the pivotal coupling between the first bars 17 and the second bars 18 and that between the second bars 18 and the coupling bar 19 are made by means of pins 22 having a vertical axis. The first bars 17 are adapted not to turn downwardly from a substantially horizontal position. Preferably, the whole protective frame 16 is fully enclosed by a flexible tube 23 to protect the baby's finger so that he will never get his fingers pinched in the coupling between the bars constituting the protective frame.

In a collapsed or folded state of the baby carriage according to the present invention, the upper bars 4 are substantially parallel to the lower bars 1 and the two X-shape coupling elements 10 are in their folded near-parallel form. As the upper bars 4 are unfolded away from the lower bars 1, the leg members 6 will stand up and the two coupling elements 10 extend into a X-like form so that the side frames 9 will move away from each other.

Figure 2:
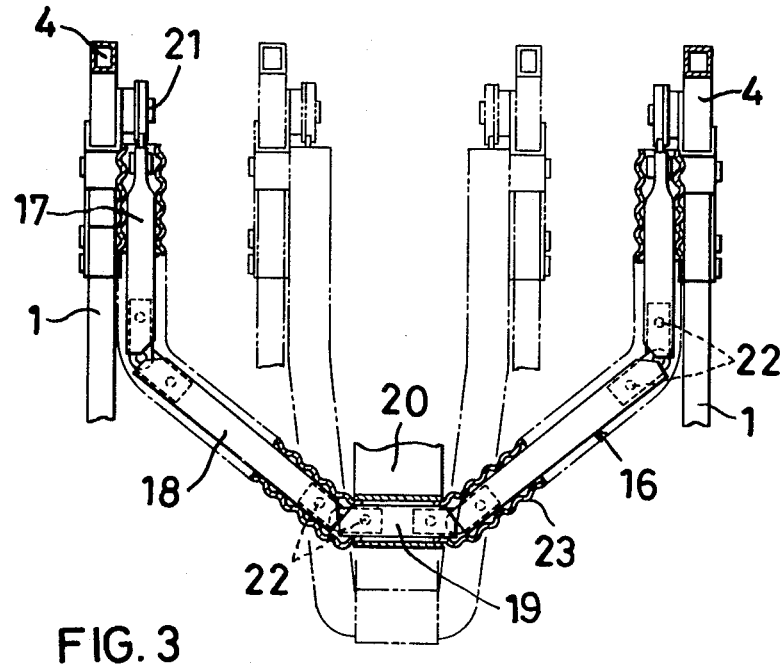
FIG. 2 is an enlarged plan view of a portion of the baby carriage of FIG. 1.
Figure 3:
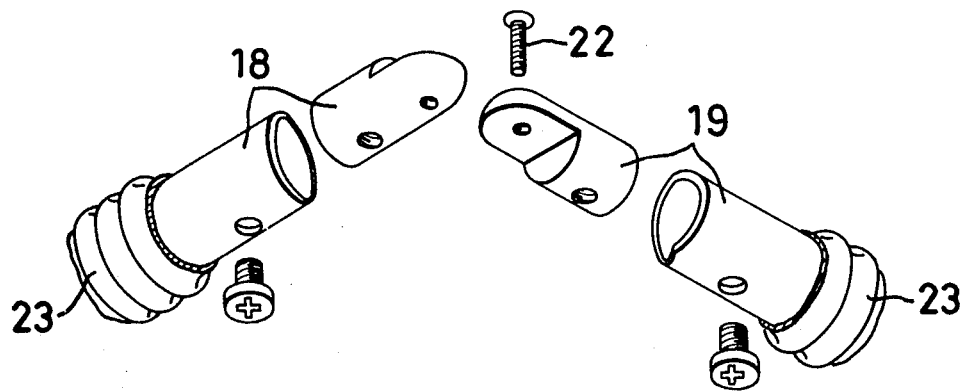
FIG. 3 is an exploded perspective view of a portion of the protective frame provided on the baby carriage.
Figure 4:
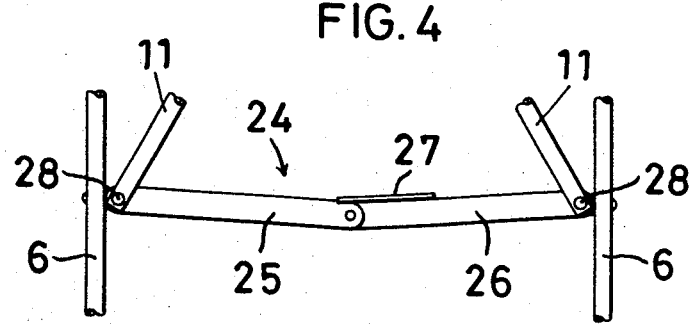
FIG. 4 is a fragmentary rear view of the baby carriage.

As the side frames 9 move away from each other, the first bars 17 of the protective frame, too, move away from each other. Thus, as shown in FIG. 2 by a solid line, the second bars 18 will bend inwardly from a near-straight inoperative state as shown in FIG. 2 by a dotted line until the protective frame comes into a fully extended operative state. The protective frame in this state protects the baby in the carriage from dropping forwardly.

When the baby carriage is folded, the first and second bars will move toward each other as the side frames 9 are pulled toward each other, until they will come to an inoperative position as illustrated in FIG. 2 by a dotted line.

It will be understood that although a preferred embodiment has been described, various variations may be made without departing from the scope of the present invention.

What we claim:

1. A folding baby carriage or the like structure comprising a pair of side frames each having an upper bar and a lower bar pivoted to said upper bar and carrying a wheel at lower end thereof, a pair of leg members pivoted to said upper bar near the lower end thereof and carrying a wheel at lower end thereof, two X-shape coupling elements each having two intersecting members, said X-shape coupling elements each having their inner corresponding ends pivoted to said leg members near the lower end thereof and their outer end pivoted to said side frames, and a lockable toggle bar pivoted to and between said leg members for keeping said coupling elements extended, further comprising a protective means comprising a pair of first bars having their one end pivoted to said upper bars, a pair of second bars pivoted to the other end of the first bars, a coupling bar pivoted to and between said second bars, and a flexible tube for covering the protective means to protect the baby's finger.

2. The folding baby carriage or the like structure as claimed in claim 1 further comprising a pair of strut members each pivoted to the associated lower bar and the associated leg member, and seat means supported on said strut members and said upper bars.

3. The folding baby carriage or the like structure as claimed in claim 2 wherein said protective means is coupled to said seat means by means of a safety belt.

* * * * *